United States Patent Office 3,133,055
Patented May 12, 1964

3,133,055
PRODUCTION OF CAPROLACTAM
Louis Grulet and Philippe Meline, Pau, France, assignors to Societe Nationale des Petroles d'Aquitaine, Paris, France, a corporation of France
No Drawing. Filed Nov. 7, 1962, Ser. No. 236,161
Claims priority, application France Mar. 16, 1962
4 Claims. (Cl. 260—239.3)

This invention relates to an improvement in the production of caprolactam and, more generally, to manufactures comprising the preparation of hydroxylamine by Raschig's reaction, followed by conversion of a ketone to an oxime and the conversion of the oxime obtained into an amide by means of an acid liquor, such as sulphuric acid.

One of the known processes for the manufacture of caprolactam, which is used in the production of certain polyamides, consists in first preparing ammonium hydroxylamine monosulphonate from nitrite, bisulphite and sulphur dioxide, according to Raschig's reaction, and then condensing it with cyclohexanone; the oxime thus obtained is converted to caprolactam by reaction with oleum, by Beckmann's method. During the first stage of the process, certain amounts of ammonia and of sulphur dioxide are consumed; at its end, at the moment of recovery of the caprolactam produced, an amount of a base necessary for the neutralization of the oleum used for the conversion is also consumed; this base is most usually ammonia, which allows the residual sulphuric acid to be put into the form of ammonium sulphate, which can be used especially as fertilizer.

The manufacture of one ton of caprolactam by this known method necessitates the consumption of two tons of sulphur dioxide; it is thus necessary to burn one ton of elementary sulphur to obtain these two tons of sulphurous gas, which is strongly diluted with nitrogen derived from the air of combustion.

The present invention relates to an improvement which allows an economy in the use of sulphur, and also facilitates certain operations, especially by the use of practically pure sulphur dioxide, not diluted with nitrogen, in the Raschig stage of the process.

The process according to the invention consists in neutralizing the acid liquor resulting from the Beckmann rearrangement (transposition into amide of an oxime of a ketone, by means of an aqueous solution of ammonium sulphite and/or bisulphite; the process is especially applicable to the manufacture of caprolactam by using the liquor resulting from the Beckmann rearrangement of cyclohexanone oxime.

According to this novel process, various inexpensive sulphite or bisulphite solutions can be used for the neutralization of the sulphuric acid in the recovery of the caprolactam, or if desired one or more other amides obtained by rearrangement of corresponding oximes, in acidic medium.

A particularly advantageous way of carrying out the invention consists in using for this purpose an aqueous solution obtained by washing the residual gases from a sulphur factory, the composition of which may vary for example within the following limits:

| | Moles/l. |
|---|---|
| Ammonium sulphite | 1.3 to 2.7 |
| Ammonium bisulphite | 2.7 to 1.3 |
| Ammonium sulphate | 0.2 to 0.4 |

Excellent results are obtained with a solution containing, in moles per litre,

| | |
|---|---|
| Ammonium sulphite | 1.8 |
| Ammonium bisulphite | 2.2 |
| Ammonium sulphate | 0.4 |

A notable advantage of this particular form of carrying out the invention resides in the fact that the solutions mentioned above are obtained from gas containing a very small proportion of sulphur dioxide in a highly diluted state, especially 0.5 to 2% by volume. Despite these low proportions, concentrated solutions of sulphite and of bisulphite are obtained, as is seen above. When such solutions are used for the neutralization of the acidic liquors derived from the known Beckmann rearrangement of an oxime, practically pure sulphur dioxide is obtained, not diluted by nitrogen as is the gas obtained by the combustion of sulphur.

The sulphurous gas given off in the course of the neutralization is used for the preparation of hydroxylamine by Raschig's process. An economy of elementary sulphur of one ton per ton of caprolactam produced is thus obtained, whilst recovering the sulphur dioxide from the deleterious residual gas or fumes, which could not be allowed to escape into the atmosphere without a previous alkaline washing.

According to a preferred feature of the invention, in the case where the amount of sulphur dioxide given off in the course of neutralization of the acidic Beckmann liquors is not sufficient to produce the desired tonnage of oxime, the remaining necessary amount of sulphurous gas is provided, for this production, in the form of a solution of ammonium sulphite and/or bisulphite. The quantities and compositions of this solution are of course suitably chosen in relation to the quantities of free sulphur dioxide, derived from the neutralization.

It is to be noted that, on account of the presence of ammonium sulphate in the sulphitic solution used, the neutralization of a sulphuric Beckmann liquor furnishes an amount of ammonium sulphate greater than that which would be obtained by the ammoniacal neutralization.

In the particular case of a 20% oleum, neutralized with the sulphite/bisulphite solution mentioned above, 100 kg. of $H_2SO_4$ from the oleum neutralized lead to the obtaining of 153 kg. of $(NH_4)_2SO_4$ in place of the 135 kg. which would be given by ammoniacal neutralization.

We claim:

1. In a process for the producton of caprolactam comprising the rearrangement of cyclohexanone-oxime by means of sulfuric acid, the step which consists in neutralizing the sulfuric acid liquor, remaining after said rearrangement, with an aqueous solution containing a substantial amount of at least one of the salts selected from the group consisting of ammonium sulfite and ammonium bisulfite.

2. In a process for the production of caprolactam comprising the rearrangement of cyclohexanone-oxime by means of sulfuric acid, the step which consists in neutralizing the sulfuric acid liquor, remaining after said rearrangement, with an aqueous solution containing a substantial amount of ammonium sulfite and ammonium bisulfite.

3. In a process for the production of caprolactam comprising the rearrangement of cyclohexanone-oxime by means of sulfuric acid, the step which consists in neutralizing the sulfuric acid liquor, remaining after said rearrangement, with an aqueous solution containing per litre about 1.3 to 2.7 moles of ammonium sulfite and about 2.7 to 1.3 moles of ammonium bisulfite.

4. In a process for the production of caprolactam comprising the preparation of hydroxylamine by Raschig's reaction, reacting the hydroxylamine with cyclohexanone to form cyclohexanone-oxime, and the rearrangement of cyclohexanone-oxime to caprolactam by the action of sulfuric acid, the steps which consist in: neutralizing the sulfuric acid, remaining after said rearrangement, with an aqueous solution containing a substantial amount of ammonium sulfite and ammonium bisulfite, recovering the sulfur dioxide which forms during the neutralization, and recycling the sulfur dioxide to the said preparation of hydroxylamine by Raschig's reaction.

No references cited.